No. 810,612. PATENTED JAN. 23, 1906.
J. L. BREWTON.
VEHICLE BRAKE.
APPLICATION FILED JULY 28, 1905.
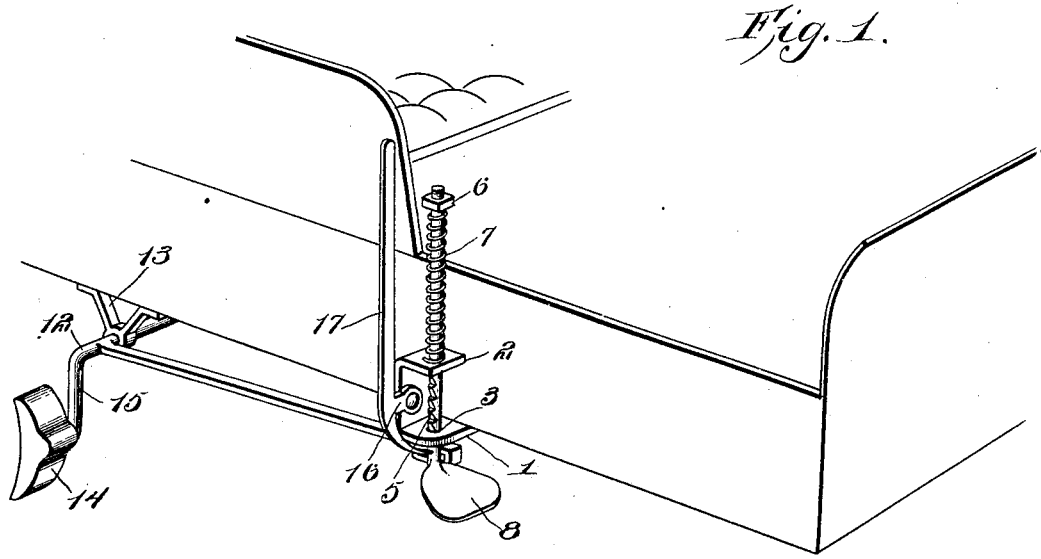
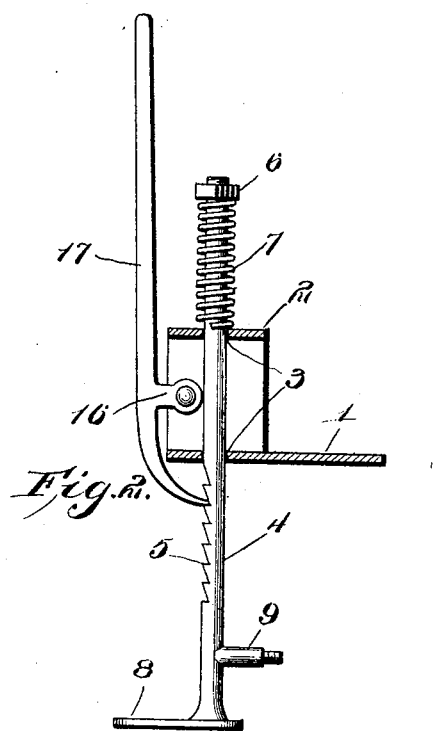
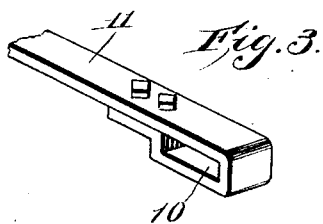
Witnesses
Louis R. Heinrichs
Herbert D. Lawson
Inventor
J. L. Brewton
By W. S. FitzGerald
Attorneys

UNITED STATES PATENT OFFICE.

JOSEPH LEVIN BREWTON, OF MILL, LOUISIANA.

VEHICLE-BRAKE.

No. 810,612.　　　　　Specification of Letters Patent.　　　　　Patented Jan. 23, 1906.

Application filed July 28, 1905. Serial No. 271,626.

*To all whom it may concern:*

Be it known that I, JOSEPH LEVIN BREWTON, a citizen of the United States, residing at Mill, in the parish of Winn and State of Louisiana, have invented certain new and useful Improvements in Vehicle-Brakes; and I do hereby declare the following to be a full, clear, and exact description of the invention, such as will enable others skilled in the art to which it appertains to make and use the same.

My invention relates to brakes for vehicles, and more particularly to means for actuating same; and its object is to provide mechanism whereby the brakes will be automatically applied when the weight of a person is placed upon the step of the vehicle.

A still further object is to provide means for locking the brakes when applied.

With the above and other objects in view the invention consists of a spring-supported step mounted in suitable guides at the side of a vehicle-body, and this step is connected to and adapted to actuate an arm extending from the brake-beam, so that when the step is pushed downward the brake is applied. The stem of the shoe is toothed and normally engaged by means of a lever, whereby the brake will be held normally when applied, but can be readily released.

The invention also consists of certain other novel features of construction and combination of parts, which will be hereinafter more fully described, and pointed out in the claims.

In the accompanying drawings I have shown the preferred form of my invention.

In said drawings, Figure 1 is a perspective view of a portion of a vehicle, showing my improved brake-operating mechanism. Fig. 2 is a front elevation of the step and the mechanism connected thereto, the step-guide being shown in section; and Fig. 3 is an enlarged detail view of one end of the arm of the brake-beam.

Referring to the figures by numerals of reference, 1 is a plate having an L-shaped bracket 2 extending therefrom, and within this bracket and the plate 1 are formed apertures 3; in which is slidably mounted a stem 4, having ratchet-teeth 5 formed along one portion thereof. An adjustable head 6 is disposed at the upper end of the stem, and interposed between this head and the bracket 2 is a coiled spring 7, which serves to hold the lower end of the stem normally close to the plate 1. This lower end of stem 4 is provided with a step 8, and an arm 9 extends at right angles from the stem and travels within a slot 10, formed by bending backward and securing the end of an arm 11. This arm extends forward from a rotatable brake-beam 12, which is mounted in brackets 13, and has a brake-shoe 14 secured to it by means of a crank 15. An arm 16 is pivoted to the bracket 2 and extends laterally therefrom, and located at the outer end of this arm is a lever 17, the lower end of which extends inward and normally engages by gravity one of the teeth 5.

When a person places his weight upon the step 8, so as to get into the vehicle, his weight will cause the step to move downward, and the spring 7 will be compressed between the bracket 2 and the head 6. The downward movement of the step and its stem 4 causes arm 9 to press downward on arm 11 and swing the brake-shoe 14 against the wheel of the vehicle. The vehicle cannot therefore start while the person is getting into the carriage. As the weight of the lever 17 is outside of a vertical line passing through the pivot of the arm 16, it will be obvious that the lever will be held by gravity normally in engagement with the stem, and therefore as soon as the weight is removed from step 8 said step will be held in lowered position by said lever. When it is desired to release the brake, lever 17 is drawn toward the vehicle, so as to free the teeth 5, and spring 7 will therefore return all of the parts to their initial positions. It will be noticed that arm 9 is threaded at one end. This is to receive a nut or other retaining device which has not been shown.

Having thus fully described my invention, what I claim as new, and desire to secure by Letters Patent, is—

1. The combination with a vehicle-body having a brake movably connected thereto; of a movable step, means actuated thereby for applying the brake when the step is depressed, and means for automatically locking the step when depressed.

2. The combination with a vehicle-body having a brake movably connected thereto; of a resiliently-supported step, means actuated thereby for operating the brake, and means for automatically locking the step when depressed.

3. The combination with a vehicle-body and a brake movably connected thereto; of a spring-supported step connected to the body, means actuated by the step for operating the brake, and a lock for holding the step against movement.

4. The combination with a vehicle-body and a brake movably connected thereto; of a spring-supported step, means operated thereby for actuating the brake, and a locking device for holding the brake applied when the spring is under tension.

5. The combination with a vehicle-body and a brake movably connected thereto; of a guide secured to the vehicle-body, a spring-supported stem mounted within the guide, a step upon the stem, means actuated by the stem for operating the brake, and a locking device for engaging the stem.

6. The combination with a vehicle-body and a brake movably connected thereto; of a toothed spring-supported stem, a guide therefor connected to the vehicle-body, a step upon the stem, means actuated by the stem for operating the brake, and a lever normally engaging the toothed portion of the stem.

In testimony whereof I have signed my name to this specification in the presence of two subscribing witnesses.

JOSEPH LEVIN BREWTON

Witnesses:
J. D. PACE,
J. S. ANDERSON.